Dec. 3, 1957  YRJÖ WILSKA  2,815,485

PHASE COMPARATOR

Filed Feb. 4, 1953  2 Sheets-Sheet 1

Inventor:
YRJÖ WILSKA
BY

Dec. 3, 1957  YRJÖ WILSKA  2,815,485
PHASE COMPARATOR
Filed Feb. 4, 1953  2 Sheets-Sheet 2

Inventor:
YRJÖ WILSKA
BY:

United States Patent Office 2,815,485
Patented Dec. 3, 1957

2,815,485

PHASE COMPARATOR

Yrjö Wilska, Helsinki, Finland

Application February 4, 1953, Serial No. 335,025

Claims priority, application Finland December 19, 1952

9 Claims. (Cl. 324—88)

This invention relates to a phase comparator for determining the phase difference of two electrical oscillations and has for its object to provide improved apparatus of the kind described.

Another object of the invention is to provide a phase comparator which indicates directly on a scale the phase difference in degrees between two oscillatory electrical signals and at the same time gives the direction of the phase difference, thereby indicating which oscillation of the two is leading and which is lagging.

Still another object of the invention is to provide a phase comparator which will function throughout a wide frequency range varying from a few cycles per second to hundreds and thousands of megacycles per second.

The working principle of the phase comparator according to the present invention consists in coupling two alternating voltages whose phase difference must be determined to two opposite terminals of a bridge circuit having opposite arms thereof formed of impedance elements having equal impedances at the frequency of the voltages to be compared, the vectors representing the impedances of the elements in adjacent arms of the bridge circuit being always at right angles to each other, and coupling the other two opposite terminals of the bridge circuit to the input terminals of a vertical amplifier of a cathode ray oscilloscope and to the input terminals of the horizontal amplifier, respectively, whereby on the screen of the cathode ray tube is produced, depending on the order of the phase difference, a line adapted to be deflected to indicate directly by its bearings the order and direction of the phase difference angle when the amplitudes of the voltages coupled to the bridge circuit are adjusted to be equal. In other circumstances the screen will show a flattened ellipse the major axis of which will represent the said line.

Figure 1:
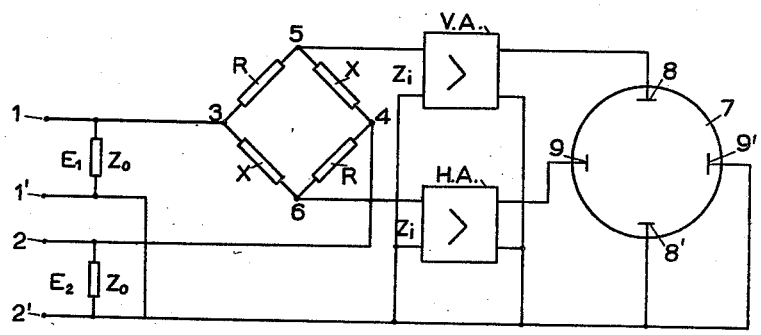
Figure 2:
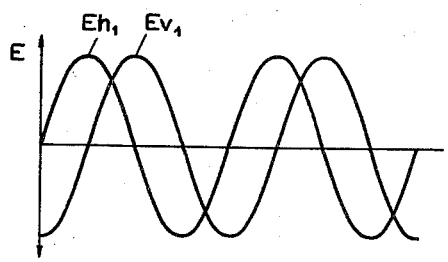
Figure 3:
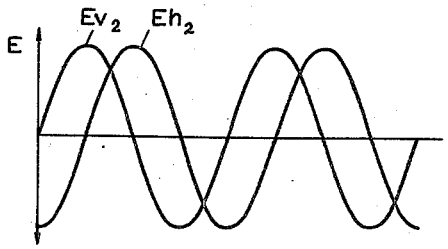
Figure 4:
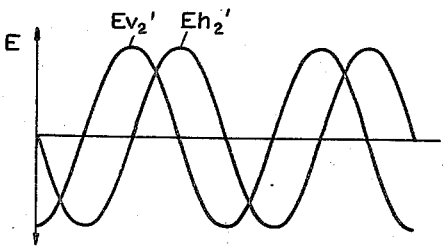

Other objects and advantages of the invention will appear from the following detailed description thereof with reference to the accompanying drawings wherein:

Fig. 1 is an electrical schematic diagram of a phase comparator embodying the present invention, and Figs. 2, 3, and 4 are graphical representations of the voltages developed in different instances on the deflecting plates of the cathode ray tube.

Figure 5:
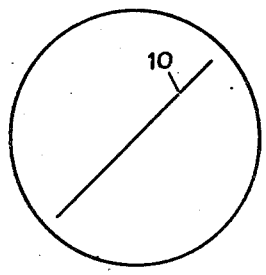
Figure 6:
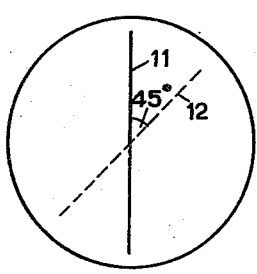

Figs. 5 and 6 diagrammatically illustrate the lines produced in corresponding instances on the screen of the cathode ray tube.

Figure 7:
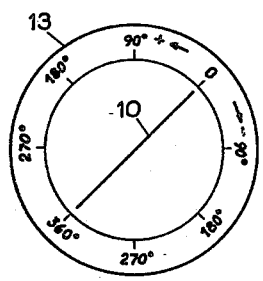
Figure 8:
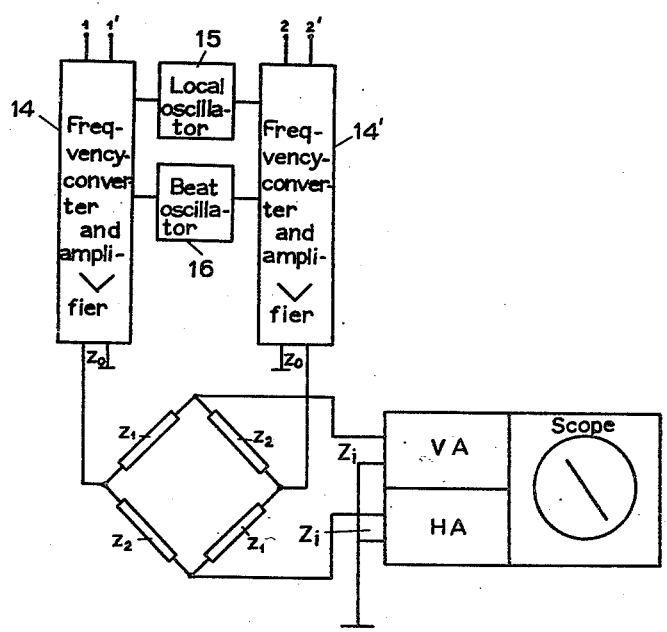

Fig. 7 diagrammatically illustrates a scale arranged in front of the cathode ray tube, and Fig. 8 is an electrical schematic diagram of another electrical circuit in a phase comparator embodying the invention.

In the phase comparator of Fig. 1 the alternating voltages $E_1$ and $E_2$ are coupled to terminals 1, 1' and terminals 2, 2', respectively. The terminals 1' and 2' are grounded to the phase comparator chassis. Connected between the terminals 1, 1' and 2, 2' are the impedances $Z_0$ including the output impedance of the voltage sources. The terminals 1 and 2 are connected to two opposite terminals 3 and 4 respectively of a bridge circuit composed of two resistors R and reactances X. The other two opposite terminals 5 and 6 of the bridge circuit are coupled to the input of the vertical amplifier (V. A.) of the cathode ray (C. R.) tube and the input of the horizontal amplifier (H. A.), respectively. First, the values of R and X are so adjusted that at the frequency of the voltages to be compared $R=|x|$ and $|Z_1|\gg R=|X|\gg |Z_0|$, wherein $Z_1$ is the input impedance of the amplifiers V. A. and H. A. Now let us study the instance wherein $E_1$ only is connected to the terminals 1, 1' of the phase comparator, hence $E_2=0$. In such a case, the voltage $EV_1$ shown in Fig. 2 and developed across the pure ohmic resister R between the terminals 3 and 5 of the bridge circuit is produced at the vertical deflecting plates 8 and 8' of the C. R. tube 7 by means of the vertical amplifier V. A., while the voltages $EH_1$ shown in Fig 2 and developed across the pure reactance X between the terminals 3, 6 of the bridge circuit is produced at the horizontal deflecting electrodes 9 and 9' by means of the horizontal amplifier H. A. These voltages are displaced 90° from each other and have equal amplitudes, provided that the vertical and horizontal amplifiers V. A. and H. A. have similar frequency and amplifying properties. These voltages will develop upon the screen of the C. R. tube a point of light moving in a circular path, which fact anyone skilled in the art can easily ascertain. Then, to the terminals 2 and 2' is coupled the voltage $E_2$ having a frequency and an amplitude equal to that of the voltage $E_1$ and having the same phase. This voltage will produce at the respective deflecting plates of the C. R. tube, the voltages $EV_2$ and $EH_2$ shown in Fig. 3. Upon the screen of the C. R. tube these voltages alone will produce a point of light moving along a circular path, the direction of rotation of said point of light being opposite to the one in the foregoing case while the rotation speed and the diameter of the circle remain unchanged. Together the voltages $EH_1$, $EV_1$, $EV_2$ and $EH_2$ will produce, as a resultant of the said circular movements, a point of light moving back and forth in a straight line at an angle of 45° to the deflection direction. Consequently the screen will show the line 10 illustrated in Fig. 5. Let us further study the case wherein the terminals 2, 2' have coupled thereto the voltage $E_2$ which lags 90° behind the voltage $E_1$ and has the same amplitude and frequency as the voltage $E_1$. This voltage $E_2$ produces at the deflection plates of the C. R. tube, the voltages $EV_2'$ and $EH_2'$ shown in Fig. 4. In this case the screen of the C. R. tube shows the vertical line 11 illustrated in Fig. 6, which line 11 can easily be ascertained e. g. by graphical construction, point by point, on the basis of the voltages $EH_1$, $EV_1$, $EV_2'$ and $EH_2'$ produced at the said deflecting plates. Continuing thus to ever greater phase differences between the applied input voltages, the line produced on the screen of the C. R. tube will be deflected by larger and larger amounts, said line being at all times proportional to the phase angle, and attain the position 12, shown in dash lines in Fig. 6 subsequent to turning a straight angle 180°, the phase angle being a full 360°, hence an integral cycle. Moreover, on the basis of the foregoing it is natural, that should the voltage $E_2$ lead $E_1$ the said line will reverse its position on the said screen. This being the case the phase comparator according to the instant invention will also show which one of the two voltages to be compared is leading and which is lagging.

Fig. 7 shows the line produced on the screen of the C. R. tube in the zero (0) position, the phase difference scale 13 from which the phase difference angle can be directly read in degrees as can also the direction of the phase difference.

In practice, it is advantageous to make the output impedances $Z_0$ as low as possible e. g. by means of transformers, in order to have $Z_0 \ll R=|X|$. Since in the function of this circuit it is advantageous that $Z_1 \gg R=|X|$ we can profitably choose the impedances so, that $$R=|x|=\sqrt{|Z_0| \cdot |Zi|}$$

E. g., $|Z_0|=1\Omega$, $R=|x|=1000\Omega$ and $|Zi|=1M\Omega$. Advantageously a low loss condenser may be used as the reactance X.

The hereinabove described phase comparator is well adapted for use at comparatively low frequencies, in which case the self-capacitance and self-inductance of the ohmic resistance R as also the self-inductance and loss resistance of the reactance X, have no deleterious effect. But the higher the frequencies the greater will be the effect produced by the said factors with consequent disturbance in operation of the bridge circuit and difficulties in fullfilling the conditions set on the impedances of the bridge circuit.

Fig. 8 shows a modification of a phase comparator embodying the invention and adapted for use in high frequency operations. In this modification the bridge circuit consists of the impedances $Z_1$ and $Z_2$, the impedances $Z_1$ and $Z_2$ being so chosen that at a comparatively low frequency, e. g., 10 kilocycles: $|Z_1|=|Z_2|$ and the phase angle therebetween=$90°$.

Both high frequency voltages to be compared in phase are coupled to the respective amplifier channels 14 and 14', said channels being as much alike in frequency properties as possible, hence operating to change the phase of the two voltages by equal amounts. In both channels the frequency of the high frequency voltages to be compared is so converted that the output voltages produced from the two amplifying channels possess the frequency for which the bridge circuit impedance elements $Z_1Z_2$ are dimensioned, said voltages having the same phase difference as that of the high frequency voltages coupled to the inputs of the amplifier stage. This can be effected in prior known manner by employing local and beat oscillators, respectively 15 and 16, common to the amplifying channels, for converting frequency, the said low frequency comparison voltages suitable for phase comparison purposes being obtained from the outputs of the amplifier channels by suitable adjustment of the oscillation frequencies of said local and beat oscillators. The oscillators 15 and 16 may also be separate for each channel provided the same are mutually synchronized. Advantageously between the output impedances $Z_0$ of the amplifier channels and the impedances $Z_1$, $Z_2$ of the bridge circuit as also the input impedances of the C. R. oscilloscope the formulas $$|Z| \ll |Z_1|=|Z_2| \ll |Zi|$$

e. g.

$$|Z_1|=|Z_2|=\sqrt{|Zi| \cdot |Zo|}$$

should be valid.

Here, attention is called to the fact that on the basis of tests made by us the favourable fact has been observed that the frequency of the alternating voltages to be compared may deviate up to 10 percent of the frequency adjusted to the bridge circuit without producing notable errors. Hence the apparatus is not too critical with respect to frequency, which fact in many instances is of notable advantage.

Obviously, many modifications may be made in the constructional details of the phase comparator made in accordance with the teachings of the instant invention depending on the purpose for which the same is being used.

Here, mention is made of the fact that the phase comparator according to the instant invention can advantageously be adapted for use in synchronizing and phasing two alternating voltage supplies to be coupled together. Let $f_1$ and $f_2$ be the frequencies of the voltage supplies. When the two supplies are coupled suitably to the phase comparator made in accordance with the instant invention, the indicator ellipse or line will turn with the rotation speed of $$\frac{f_1-f_2}{2}$$

and the rotation direction will show which one of the two voltage supplies has the greater frequency.

The phase comparator according to the present invention may also be provided with a recorder. For this purpose a transparent sheet provided with parallel lines and adapted to be turned by means of a control knob may be arranged in front of the screen of the C. R. oscilloscope. When the said sheet is turned by means of the control knob so as to render the said parallel lines parallel with axis of the flattened ellipses or the said line and when the control knob is adapted to simultaneously move the recording element of the recorder, the comparator indication can be transferred to the recorder.

I claim:

1. A phase comparison arrangement comprising, in combination, cathode ray tube indicator means including horizontal deflecting means and vertical deflecting means, each of said deflecting means respectively having spaced first and second members, said second members be connected with each other; a four terminal network comprising a bridge circuit having four arms, each of said four terminals of said network corresponding respectively to a junction point between different adjacent pairs of arms of said network, two opposite terminals being input terminals and the remaining two opposite terminals being output terminals, opposite ones of said arms having the same phase shift producing characteristic at a given frequency, and adjacent ones of said arms providing a phase shift in quadrature phase relation to one another; a first source continuously providing a wave at said given frequency connected between one of said input terminals of said bridge circuit and said second members of said deflecting means; a second source continuously providing a second wave at said given frequency which is desired to compare in phase with said first wave and connected between said other input terminal of said bridge circuit and said second members of said deflecting means; first circuit means coupling one of said output terminals of said bridge circuit with said first member of said horizontal deflecting means; and second circuit means coupling said other output terminal of said bridge circuit with said first member of said vertical deflecting means.

2. A phase comparison arrangement as set forth in claim 1 wherein one pair of opposite arms of said bridge circuit includes pure ohmic impedance elements of a given value, and the other pair of opposite arms of said bridge circuit includes low loss reactive elements of a given value at said given frequency.

3. A phase comparison arrangement as set forth in claim 1 wherein the absolute value of impedance of each of said arms of said bridge circuit are equal at said given frequency and said value of impedance substantially exceeds the output impedance of said two sources.

4. A phase comparison arrangement as set forth in claim 1 wherein the absolute value of impedance of each of said arms of said bridge circuit are equal at said given frequency and said value of impedance substantially exceeds the output impedance of said two sources at said given frequency and is substantially less than the input impedance at said given frequency of said two circuit means.

5. A phase comparison arrangement comprising, in combination, cathode ray tube means including horizontal deflecting means and vertical deflecting means, each of said deflecting means respectively having spaced first and second members, said second members being connected with each other; a four terminal network comprising a bridge circuit having four arms, each of said four terminals of said network corresponding respectively to a junction point between different adjacent pairs of arms of said network, two opposite terminals being input terminals and the remaining two opposite terminals being output terminals, opposite ones of said arms having the same phase shift producing characteristics at a given frequency, and adjacent ones of said arms providing a phase shift in quadrature phase relation to one another; a first source having a pair of second output terminals for continuously providing a wave at said given frequency; conductive means connecting one of said second output terminals to one of said input terminals of said bridge circuit and connecting the other of said second output terminals to said second members of said deflecting means; a second source having a pair of third output terminals for continuously providing a second wave at said given frequency which it is desired to compare in phase with said first wave; conductive means connecting one of said third output terminals to said other input terminal of said bridge circuit and connecting the other of said third output terminals to said second members of said deflecting means; first circuit means coupling one of said output terminals of said bridge circuit to said first member of one of said deflecting means; and second circuit means coupling the other output terminal of said bridge circuit to said first member of the other of said deflecting means.

6. A phase comparison arrangement as set forth in claim 5 wherein said first and second circuit means include amplifier means.

7. A phase comparison arrangement as set forth in claim 6 wherein one pair of opposite arms of said bridge circuit includes pure ohmic impedance elements of a given value, and the other pair of opposite arms of said bridge circuit includes low loss capacitive elements having an absolute value of impedance at said given frequency equal to said given value.

8. A phase comparison arrangement as set forth in claim 7 wherein said given value of impedance substantially exceeds the output impedances of said two sources and is substantially smaller than the input impedances of said two circuit means at said given frequency.

9. A phase comparison arrangement comprising, in combination, cathode ray tube means including horizontal deflecting means and vertical deflecting means, each of said deflecting means respectively having spaced first and second members, said second members being connected with each other; a network comprising a bridge circuit having four arms and a terminal at the junction point of each pair of arms, opposite ones of said arms having the same phase shift producing characteristics at a given frequency, and adjacent ones of said arms providing a phase shift in quadrature phase relation to one another; a first source having a pair of output terminals for continuously providing a wave at a frequency greater than said given frequency; first frequency conversion means connected to said output terminals for converting said wave to a wave at said given frequency; conductive means connecting said last-named means to a first terminal of said bridge circuit; a second source having a pair of output terminals for continuously providing a second wave which it is desired to compare in phase with said first wave, said second wave having the same frequency as said first wave; second frequency conversion means connected to said output terminals of said second source for converting said second wave to a wave at said given frequency while maintaining the phase relationship of said waves the same; conductive means connecting said first frequency conversion means to one terminal of said bridge circuit; second conductive means connecting said second frequency conversion means to an opposite terminal of said bridge circuit; first circuit means connecting a third terminal of said bridge circuit to said first member of one of said deflecting means; and second circuit means connecting the fourth terminal of said bridge circuit to said first member of the other of said deflecting means.

References Cited in the file of this patent

UNITED STATES PATENTS

| | | |
|---|---|---|
| 1,385,979 | Allcutt | Aug. 2, 1921 |
| 2,328,985 | Luck | Sept. 7, 1943 |
| 2,426,721 | Adams | Sept. 2, 1947 |
| 2,516,858 | Dishal | Aug. 1, 1950 |
| 2,580,803 | Logan | Jan. 1, 1952 |
| 2,595,263 | Ingalls | May 6, 1952 |

FOREIGN PATENTS

| | | |
|---|---|---|
| 367,183 | Italy | Jan. 18, 1939 |
| 591,928 | Great Britain | Sept. 2, 1947 |